United States Patent
Tobolski et al.

(10) Patent No.: US 9,805,602 B2
(45) Date of Patent: Oct. 31, 2017

(54) PARKING SERVICE

(71) Applicant: Ford Global Technologies, LLC, Dearborn, MI (US)

(72) Inventors: Tricia Tobolski, Harrison Township, MI (US); Jeffrey Lee Hentschel, Novi, MI (US); Chad Evert Esselink, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

(21) Appl. No.: 14/335,969

(22) Filed: Jul. 21, 2014

(65) Prior Publication Data

US 2016/0019790 A1  Jan. 21, 2016

(51) Int. Cl.
*G08G 1/00* (2006.01)
*G07B 15/06* (2011.01)
(Continued)

(52) U.S. Cl.
CPC ......... *G08G 1/146* (2013.01); *G01C 21/3685* (2013.01); *G06Q 10/02* (2013.01);
(Continued)

(58) Field of Classification Search
CPC ...... G06Q 10/02; G06Q 50/30; G06Q 50/265; G06Q 10/00; G06Q 10/025; G06Q 20/02; G06Q 20/145; G06Q 30/0284; G06Q 30/04; G08G 1/14; G08G 1/146; G08G 1/148; G08G 1/09675; G08G 1/096775; G08G 1/142; G08G 1/096716; G08G 1/096791; G08G 1/096827; G08G 1/096844; G08G 1/096861; G08G 1/096883; G08G 1/096888; G08G 1/0969; G08G 1/133; G08G 1/141; G08G 1/147; G08G 1/20; G07B 15/00; G07B 15/02; G01C 21/3476;
(Continued)

(56) References Cited

U.S. PATENT DOCUMENTS 6,696,981 B1 * 2/2004 Hashimoto ............ G06Q 10/02
235/384
9,275,546 B2 * 3/2016 Aravkin ............. G01C 21/3685
(Continued)

FOREIGN PATENT DOCUMENTS

CN  203250420 U  10/2013
EP  2136346 A2  12/2009
(Continued)

OTHER PUBLICATIONS

GB Search Report for Application No. GB1512371.4 dated Sep. 29, 2015.

*Primary Examiner* — Fekadeselassie Girma
(74) *Attorney, Agent, or Firm* — Frank A. MacKenzie; Bejin Bieneman PLC

(57) ABSTRACT

A vehicle system includes a communication interface and a processing device. The processing device determines a proximity of a host vehicle to a target location. When the proximity to the target location is less than a predetermined value, the processing device commands the communication interface to transmit the target location to a parking server. In response, the processing device receives a message identifying at least one parking zone from the parking server.

20 Claims, 2 Drawing Sheets

(51) Int. Cl.
  *G08G 1/14*     (2006.01)
  *G06Q 10/02*    (2012.01)
  *G06Q 50/30*    (2012.01)
  *G08G 1/0968*   (2006.01)
  *G08G 1/0969*   (2006.01)
  *G01C 21/36*    (2006.01)

(52) U.S. Cl.
  CPC ............ *G06Q 50/30* (2013.01); *G07B 15/06* (2013.01); *G08G 1/0969* (2013.01); *G08G 1/09685* (2013.01); *G08G 1/096838* (2013.01); *G08G 1/096861* (2013.01); *G08G 1/096883* (2013.01); *G08G 1/143* (2013.01); *G08G 1/144* (2013.01); *G08G 1/147* (2013.01); *G08G 1/148* (2013.01); *G08G 1/20* (2013.01)

(58) Field of Classification Search
  CPC ............ G01C 21/3614; G01C 21/3685; G06T 2207/10004; G06T 2207/30236; G06T 2207/30264; G06T 7/004; G06T 7/0042; G06T 7/20; G06T 7/2093; G07F 17/0021; G07F 17/24; G07F 17/246
  USPC .............. 340/932.2, 5.2, 5.42, 5.7, 933, 988
  See application file for complete search history.

(56) References Cited

U.S. PATENT DOCUMENTS

| | | | |
|---|---|---|---|
| 2006/0025105 A1* | 2/2006 | Sato | H04M 1/72527 455/343.1 |
| 2007/0040701 A1 | 2/2007 | Browne et al. | |
| 2007/0050240 A1* | 3/2007 | Belani | G08G 1/14 705/13 |
| 2007/0129974 A1* | 6/2007 | Chen | G06Q 10/02 705/5 |
| 2009/0243889 A1* | 10/2009 | Suhr | G06K 9/00812 340/932.2 |
| 2010/0060485 A1* | 3/2010 | Kim | G08G 1/143 340/932.2 |
| 2010/0302068 A1* | 12/2010 | Bandukwala | H04W 4/046 340/932.2 |
| 2011/0106425 A1* | 5/2011 | Trum | G01C 21/3476 701/533 |
| 2011/0115819 A1* | 5/2011 | Hanson | G06F 1/1626 345/649 |
| 2011/0117969 A1* | 5/2011 | Hanson | H04M 1/72552 455/566 |
| 2012/0092190 A1* | 4/2012 | Stefik | G06Q 10/02 340/932.2 |
| 2012/0190299 A1* | 7/2012 | Takatsuka | H04B 5/00 455/41.1 |
| 2012/0286968 A1* | 11/2012 | Jones | G07B 15/02 340/870.02 |
| 2013/0325565 A1 | 12/2013 | Toussaint | |
| 2014/0036076 A1* | 2/2014 | Nerayoff | H04N 7/181 348/148 |
| 2014/0062727 A1* | 3/2014 | Aivas | G08G 1/146 340/932.2 |
| 2014/0078533 A1* | 3/2014 | Yamaguchi | G06F 3/1208 358/1.13 |
| 2014/0139677 A1* | 5/2014 | Lambert | B60K 35/00 348/148 |
| 2014/0176348 A1* | 6/2014 | Acker, Jr. | G08G 1/144 340/932.2 |
| 2014/0249742 A1* | 9/2014 | Krivacic | G06Q 10/02 701/400 |
| 2014/0309789 A1* | 10/2014 | Ricci | B60Q 1/00 700/276 |
| 2014/0309864 A1* | 10/2014 | Ricci | H04W 48/04 701/36 |
| 2014/0309924 A1* | 10/2014 | Varoglu | G01C 21/206 701/410 |
| 2014/0372155 A1* | 12/2014 | Wang | G06Q 10/02 705/5 |
| 2015/0170425 A1* | 6/2015 | Bajekal | G07C 9/00111 705/13 |
| 2016/0025503 A1* | 1/2016 | Kees | G08G 1/144 701/400 |

FOREIGN PATENT DOCUMENTS

| | | |
|---|---|---|
| EP | 2330580 A1 | 6/2011 |
| JP | 20050021227 | 12/2004 |
| JP | 2012058931 A | 3/2012 |
| KR | 1020040102388 | 12/2014 |
| WO | 2012141665 | 10/2012 |

* cited by examiner

PARKING SERVICE

BACKGROUND

Finding parking spaces in crowded urban areas can be difficult and frustrating. Drivers unfamiliar with the area have no way to know how many, if any, parking spaces will be available near the intended destination. Even if spaces are available, the price of the space may be highest closest to the destination, especially for venues such as sport stadiums. If the driver is unwilling to pay the high price, the driver must travel further away, sometimes out of reasonable walking distance, to find available parking spaces that are reasonably priced.

DETAILED DESCRIPTION

One way to make parking in urban areas easier and less stressful is to give drivers more information about available parking in or near a given location. For instance, an area may be divided into multiple zones. A parking server may estimate the number of available parking spaces in each zone. The number of available parking spaces may be communicated to a vehicle when the vehicle approaches the zone. In estimating the number of parking spaces, the parking server may consider certain user preferences such as the parking price, the proximity to a target location, whether the user prefers to park on a street, in a garage, or in a surface lot, or the like.

The vehicle receiving the parking information from the parking server may incorporate a vehicle system. An exemplary vehicle system includes a number of components such as a communication interface 125 and a processing device 130. The processing device 130 determines a proximity of the vehicle to the target location. When the proximity to the target location is less than a predetermined value, the processing device 130 commands the communication interface 125 to transmit the target location to the parking server. In response, the processing device 130 receives, from the parking server, a message identifying at least one parking zone.

The systems shown in the FIGS. may take many different forms and include multiple and/or alternate components and facilities. The exemplary components illustrated are not intended to be limiting. Indeed, additional or alternative components and/or implementations may be used.

Figure 1:
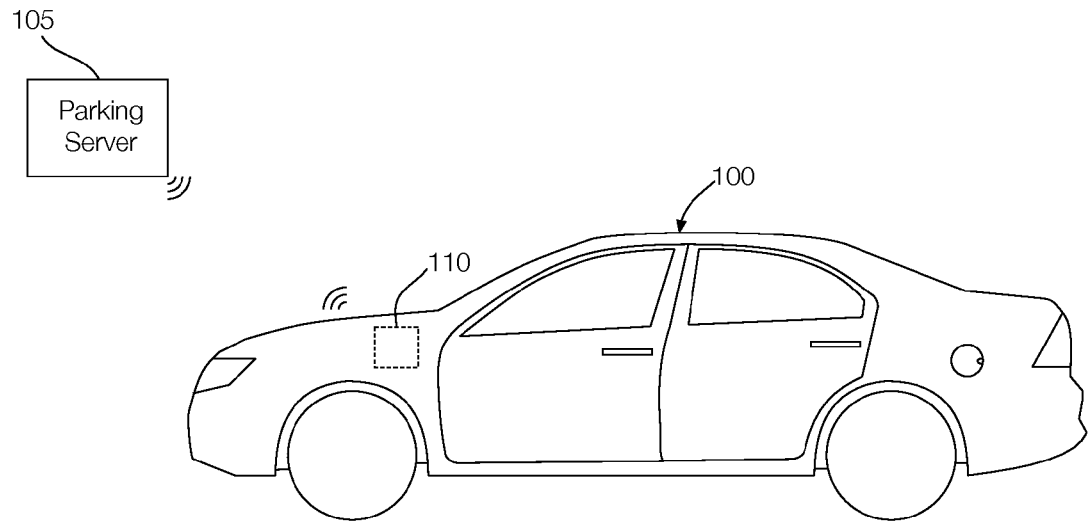
FIG. 1 illustrates an example vehicle able to receive parking information from a parking server.

As illustrated in FIG. 1, a host vehicle 100 is in communication with a parking server 105. The host vehicle 100 may be configured to receive a target location selected by a driver or other vehicle occupant. The host vehicle 100 may generate a route to the target location. By monitoring a current location relative to the target location, the host vehicle 100 may determine when the host vehicle 100 is within a predetermined distance from the target location. At that time, the host vehicle 100 may transmit certain vehicle information to the parking server 105.

The vehicle information may include the target location and the current location, the proximity of the host vehicle 100 to the target location, or both. The vehicle information may further include user preferences. The user preferences may relate to the parking relative to the target location. Examples of user preferences may include a maximum parking price, whether parking is needed within walking distance of the target location, and whether handicap parking is needed. The user preferences may further include a preference for parking infrastructure. For instance, the user preferences may indicate whether the user prefers to park in a garage, on a surface lot, on the street, etc.

After sending the vehicle information, the host vehicle 100 may receive a list of zones from the parking server 105. As discussed in greater detail below, the list of zones may be ranked according to the likely number of available parking spaces in each zone. The host vehicle 100 may prompt the driver or another occupant to select one of the zones. If no selection is made, the host vehicle 100 may automatically select the zone with the highest rank. The host vehicle 100 may generate a route to the selected zone based on directions to the zone received from, e.g., the parking server 105.

Although illustrated as a sedan, the host vehicle 100 may include any passenger or commercial vehicle such as a car, a truck, a sport utility vehicle, a taxi, a bus, etc. In some possible approaches, the host vehicle 100 may be an autonomous vehicle configured to operate in an autonomous (e.g., driverless) mode, a partially autonomous mode, and/or a non-autonomous mode.

The parking server 105 may be configured to collect data from a number of different participating vehicles, not just the host vehicle 100. The data collected may indicate how many participating vehicles are parked in a number of different zones. For instance, the parking server 105 may be configured to receive, from each participating vehicle, when the vehicle has entered a particular zone, whether the vehicle is in park or turned off while in the zone, when the vehicle is turned on, and when the vehicle leaves the zone. This information may allow the parking server 105 to estimate how many parking spaces are available in each zone.

If the parking server 105 knows or can accurately estimate the total number of available parking spaces in the zone, the parking server 105 may continually monitor the traffic into and out of each zone to estimate how many parking spaces are available. The parking server 105 may count how many participating vehicles are currently parked in the zone. The number of vehicles that are turned on and leave the zone may be subtracted from the number of parked vehicles.

The total number of spaces may be provided to the parking server 105 from, e.g., an owner of a parking lot or garage. For street parking, the total number of spaces can also be estimated from the length of the street, excluding no parking areas. In some instances, the number of spaces available in surface lots or in a garage can be estimated from the size (e.g., area) of the surface lot or garage.

The parking server 105 may be configured to account for exceptions that may reduce the number of available parking spaces. Examples of exceptions may include the number of non-participating vehicles (i.e., vehicles that do not send vehicle information to the parking server 105) in the zone, whether some parking spaces are closed or unavailable due to construction, whether certain roads are closed to traffic as a result of weather conditions (i.e., snow, flooding, etc.), whether areas are closed because of a special event such as a parade, or the like.

From the host vehicle 100, the parking server 105 may be configured to receive a message identifying the target location, indicating when the host vehicle 100 anticipates reaching the target location, and the user preferences. In response, the parking server 105 may determine which zones are closest to the target location. Of that subset of zones, the parking server 105 may filter the number of available spaces according to the user preferences. For instance, if the user preferences indicate that the user desires to park in a parking garage, the parking server 105 may eliminate any zones that do not having available spaces in a parking garage from the results. The parking server 105 may be configured to rank the remaining zones based on the number of available spaces that fit the user preferences in each zone. That is, the parking server 105 may give the zone with the highest number of available parking spaces that satisfy the user preferences the highest rank. For example, the user may have specified a parking fee of less than $15. If one zone has 100 spaces available for $20 while another has 50 spaces available for $10, the zone with the less expensive spaces may receive a higher rank since, despite having 100 open spaces, the zone with $20 spaces has no spaces that fit the user preferences. Even if the user never set a price preference, the zone with less expensive spaces might be given a higher rank simply because the likelihood of a space being available in the less expensive parking zone is effectively identical to that of the more expensive parking zone. Another example may rank zones closer to the destination higher than zones further away even if the further zone has more spaces available, especially if the user has a preference for closer zones or the likelihood of available spaces is virtually identical for both zones. Thus, the weight of the user preferences may be based on the probability that a space will be available upon arrival.

The parking server 105 may generate a message to the host vehicle 100 that identifies the zones in order of rank. As discussed above, the host vehicle 100 may permit the user to select one of the zones. In some instances, the host vehicle 100 may automatically select the highest ranked zone. The selection may be received by the parking server 105, and in response, the parking server 105 may send directions to the selected zone to the host vehicle 100.

Figure 2:
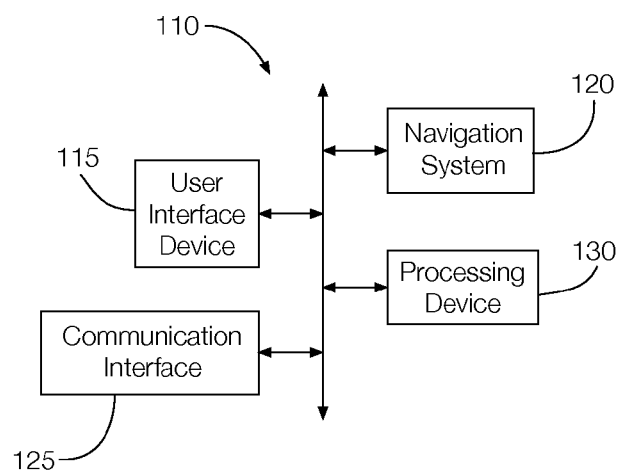
FIG. 2 is a block diagram of an example vehicle system that may be used with the vehicle of FIG. 1.

FIG. 2 is a block diagram of an example vehicle system 110 that may be incorporated into the host vehicle 100. In general, the vehicle system 110 may facilitate the communication with the parking server 105 and help the driver navigate to the recommended parking zone. The vehicle system 110, as shown, includes a user interface device 115, a navigation system 120, a communication interface 125, and a processing device 130. Some or all of these components may be incorporated into the host vehicle's 100 infotainment system. Alternatively, some or all of the components may be incorporated into one or more stand-alone devices in communication with one another. For instance, the user interface device 115 and navigation system 120 may be part of the infotainment system while the communication interface 125 and processing device 130 may be incorporated in a dongle or a mobile device such as a cell phone or tablet computer.

The user interface device 115 may be configured to present information to a vehicle occupant. Moreover, the user interface device 115 may be configured to receive user inputs. Examples of user inputs may include the target location, the user preferences, and a user selection of a parking zone. The user interface device 115 may be configured to prompt the occupant to provide the appropriate user input at various times. For instance, the user interface device 115 may prompt the occupant to select one of the parking zones after a list of acceptable parking zones is identified by the parking server 105 and transmitted to the host vehicle 100. The user interface device 115 may include a touch-sensitive display screen for receiving the user inputs.

The user interface device 115 may make the user inputs available to other components of the vehicle system 110. The target location may be shared with the navigation system 120 and communication interface 125, for example. The user preferences may be shared with the communication interface 125 and processing device 130. Data representing the user inputs may be stored in a memory device accessible to, e.g., the navigation system 120, the communication interface 125, and the processing device 130. Alternatively, the user interface device 115 may transmit certain user inputs directly to one or more of these other components.

The navigation system 120 may be configured to determine a current location of the host vehicle 100. The navigation system 120 may include a Global Positioning System (GPS) receiver configured to triangulate the position of the host vehicle 100 relative to satellites or terrestrial based transmitter towers. The navigation system 120 may be further configured to develop routes from the current location to the target location, as well as display a map and present driving directions to the target location via, e.g., the user interface device 115.

The navigation system 120 may be configured to further develop routes to the selected parking zone. As discussed above, once an acceptable parking zone is found, the parking server 105 may transmit directions to the zone to the host vehicle 100. The directions may include an address, intersection, GPS coordinates, etc. The navigation system 120 may be configured to generate a route from the current location of the host vehicle 100 to the parking zone. A map and turn-by-turn directions may be output to the occupant of the host vehicle 100 via, e.g., the user interface device 115.

The communication interface 125 may be configured to facilitate wired and/or wireless communication between the components of the vehicle and other devices, such as the parking server 105. The communication interface 125 may also be configured to communicate directly with a mobile device using any number of communication protocols such as Bluetooth®, Bluetooth® Low Energy, or WiFi. Accordingly, the communication interface 125 may be configured to send messages to the parking server 105. The messages may include the target location and the user preferences. Moreover, the communication interface 125 may be configured to receive messages transmitted by the parking server 105. The messages may represent, e.g., a list of acceptable parking zones and directions to the selected parking zone.

The processing device 130 may be configured to process signals. This may include the user inputs received via the user interface device 115, signals output by the navigation system 120, and messages received from the parking server 105. The processing device 130 may be configured to determine how far the host vehicle 100 is from the target location. For instance, the processing device 130 may determine the distance from a difference between the current location of the host vehicle 100 and the target location based on signals output by the navigation system 120. The distance may be presented spatially (e.g., in miles or kilometers) or temporally (e.g., minutes from the target location).

When the host vehicle 100 is within a certain distance from the target location, the processing device 130 may generate a message for the parking server 105. The message may identify the target location, include the user preferences, and indicate the distance of the host vehicle 100 to the target location. The processing device 130 may command the communication interface 125 to transmit the message to the parking server 105.

As discussed above, the parking server 105 may respond with a message identifying a list of acceptable parking zones. If multiple parking zones are identified in the message from the parking server 105, the processing device 130 may command the user interface device 115 to prompt the occupant to select one of the parking zones. If none are selected within a predetermined amount of time, e.g., a few seconds to a few minutes, the processing device 130 may automatically select the highest ranked parking zone. The processing device 130 may command the communication interface 125 to communicate the selected parking zone to the parking server 105.

Once the directions to the selected parking zone have been received, the processing device 130 may command the navigation system 120 to generate a route to the selected parking zone. Where the host vehicle 100 is an autonomous vehicle, the processing device 130 may further command an autonomous mode controller to navigate the host vehicle 100 to the selected parking zone.

Figure 3:
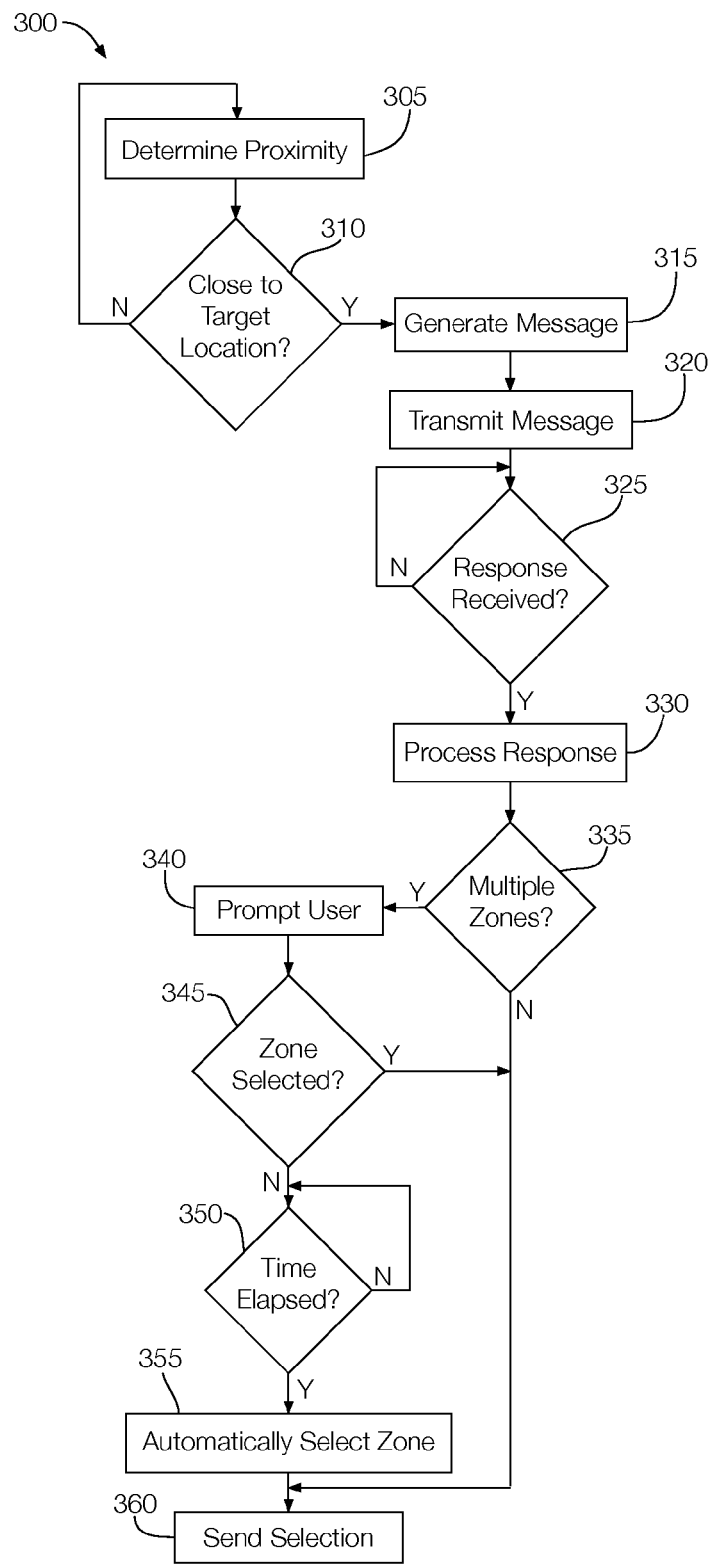
FIG. 3 is a flowchart of an example process that may be executed by one or more components of the vehicle system of FIG. 2.

FIG. 3 is a flowchart of an example process 300 that may be implemented by one or more components of the vehicle system 110.

At block 305, the processing device 130 may determine the proximity of the host vehicle 100 to the target location. The proximity may be determined directly from the navigation system 120. That is, the navigation system 120 may calculate the proximity and send it to the processing device 130. Alternatively, the processing device 130 may calculate the proximity from the distance along a route between the current location and the target location, both of which may be received from the navigation system 120.

At decision block 310, the processing device 130 may determine whether the host vehicle 100 is within a predetermined distance of the target location. For instance, the processing device 130 may compare the proximity from block 305 to the predetermined distance. If the proximity is less than the predetermined distance, the process 300 may continue at block 315. Otherwise, the process may return to block 305.

At block 315, the processing device 130 may generate a message. The message, as discussed above, may identify the target location, various user preferences, and when the processing device 130 anticipates the host vehicle 100 reaching the target location.

At block 320, the processing device 130 may command the communication interface 125 to transmit the message to the parking server 105. The communication interface 125 may transmit the message using any number of wireless telecommunication protocols.

At decision block 325, the processing device 130 may wait for the parking server 105 to respond to the message sent at block 315. If the response is received, the process 300 may continue at block 330. Decision block 325 may be repeated until the response from the parking server 105 has been received.

At block 330, the processing device 130 may process the response message received from the parking server 105. The message from the parking server 105 may identify one or more acceptable parking zones given the target location and user preferences. Processing the response from the parking server 105, therefore, may include extracting the list of acceptable parking zones from the message. If multiple parking zones are acceptable, processing the response message may further include listing the parking zones in order of rank. As discussed above, the rank may be determined by the parking server 105 and included in the message.

At block 335, the processing device 130 may determine whether the parking server 105 has identified multiple acceptable parking zones. If so, the process 300 may continue at block 340. If only one acceptable parking zone has been sent in the response from the parking server 105, the process 300 may continue at block 360.

At block 340, the processing device 130 may command the user interface device 115 to prompt the occupant to select one of the parking zones identified at block 330. The processing device 130 may command the user interface device 115 to present the list of zones in order of rank, as discussed previously.

At decision block 345, the processing device 130 may determine whether one of the zones has been selected. If so, the process 300 may continue at block 360. If no zone has been selected, the process 300 may continue at block 350.

At decision block 350, the processing device 130 may determine whether a predetermined amount of time has elapsed. The predetermined amount of time may be the amount of time allotted for the occupant to select one of the acceptable parking zones. The predetermined amount of time may range from a few seconds to a few minutes, depending on how far the host vehicle 100 is from the nearest parking zone, the highest ranked parking zone, or the target location. Moreover, the predetermined amount of time may be variable. That is, as the host vehicle 100 approaches the nearest parking zone, the highest ranked parking zone, or the target location, the predetermined amount of time given at block 350 may decrease. If the predetermined amount of time has elapsed, the process 300 may continue at block 355. Otherwise, the process 300 may return to block 345 to determine whether the occupant has selected a parking zone.

At block 355, the processing device 130 may automatically select one of the acceptable parking zones. This way, an acceptable parking zone will be selected even if the occupant is unable to make such a selection. The processing device 130 may, in one possible approach, automatically select the highest ranked parking zone absent intervention from the occupant at block 345.

At block 360, the processing device 130 may send a message to the parking server 105 identifying the selected parking zone, whether selected by the occupant at block 340 or by the processing device 130 at block 355. The processing device 130 may further command the navigation system 120 to develop a route to the selected parking zone, effectively making the selected parking zone the new destination. As discussed above, the parking server 105 may send the locations of the identified parking zones. In one possible implementation, the locations of all acceptable parking zones may be sent in the response processed at block 330. Alternatively, the location of the selected parking zone may be sent in response to the processing device 130 sending the message to the parking server 105 identifying the selected parking zone.

In general, computing systems and/or devices discussed above may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a communication interface; and
a processing device programmed to determine a proximity of a host vehicle to a target location and command the communication interface to transmit the target location to a parking server upon determining that the proximity to the target location is less than a predetermined value, wherein the processing device is programmed to receive a message identifying at least one parking zone, among a plurality of parking zones, from the parking server, and process the message,
wherein the plurality of parking zones are ranked according to an estimated number of available parking spaces based at least in part on an amount of traffic into and out of the at least one parking zone and according to a user preference received at the host vehicle and transmitted to the parking server, wherein a weight of the user preference in the ranking of the plurality of parking zones is based on a probability that a parking space will be available in the parking zone upon arrival of the host vehicle, and wherein processing the message includes the processing device listing the plurality of parking zones in the host vehicle according to the rank.

2. The vehicle system of claim 1, wherein the processing device is programmed to command the communication interface to transmit the user preference to the parking server.

3. The vehicle system of claim 2, wherein the user preference includes at least one of a maximum parking price, parking within walking distance of the target location, and handicap parking.

4. The vehicle system of claim 2, wherein the user preference identifies an infrastructure preference.

5. The vehicle system of claim 4, wherein the infrastructure preference includes at least one of a parking garage, a parking lot, and street parking.

6. The vehicle system of claim 1, wherein the processing device is programmed to determine whether the parking server has identified multiple parking zones with available parking spaces.

7. The vehicle system of claim 6, further comprising a user interface device programmed to receive a user input selecting one of the multiple parking zones.

8. The vehicle system of claim 7, wherein the user interface device is programmed to prompt a vehicle occupant to select one of the multiple parking zones.

9. The vehicle system of claim 6, wherein the processing device is programmed to automatically select one of the parking zones.

10. The vehicle system of claim 9, wherein one of the parking zones is automatically selected by the processing device if no user input is received within a predetermined amount of time.

11. The vehicle system of claim 10, wherein the processing device is configured to select one of the parking zones based on the rank associated with each parking zone.

12. The vehicle system of claim 11, wherein the rank is determined by the parking server.

13. The vehicle system of claim 11, wherein the rank is based at least in part on a proximity of each parking zone to the target location.

14. A vehicle system comprising:
a communication interface; and
a processing device configured to determine a proximity of a host vehicle to a target location and command the communication interface to transmit the target location and user preferences to a parking server when the proximity to the target location is less than a predetermined value,
wherein the processing device is configured to receive a message ranking multiple parking zones from the parking server, process the message, and automatically select one of the multiple parking zones,
wherein the multiple parking zones are ranked according to an estimated number of available parking spaces based at least in part on an amount of traffic into and out of each of the multiple parking zones and according to the user preference, wherein a weight of the user preference in the ranking of the multiple parking zones is based on a probability that a parking space will be available in the parking zone upon arrival of the host vehicle, and
wherein processing the message includes the processing device listing the plurality of parking zones in the host vehicle according to the rank.

15. The vehicle system of claim 14, wherein one of the parking zones is automatically selected by the processing device if no user input is received within a predetermined amount of time.

16. The vehicle system of claim 14, wherein the processing device is configured to select one of the parking zones based on the rank associated with each parking zone, wherein the rank is based at least in part on a proximity of each parking zone to the target location.

17. A method comprising:
determining a proximity of a host vehicle to a target location;
transmitting a first message to a parking server when the proximity of the host vehicle to the target location is within a predetermined distance, the first message identifying the target location;
receiving a response message sent from the parking server, the response message ranking a plurality of parking zones according to an estimated number of available parking spaces based at least in part on an amount of traffic into and out of the at least one parking zone and according to a user preference received at the host vehicle and transmitted to the parking server, wherein a weight of the user preference in the ranking of the plurality of parking zones is based on a probability that a parking space will be available in the parking zone upon arrival of the host vehicle; and
processing the message, wherein processing the message includes listing the plurality of parking zones in the host vehicle according to the rank.

18. The method of claim 17, determining whether the response message identifies multiple parking zones.

19. The method of claim 18, further comprising, if the response message identifies multiple parking zones:
prompting a vehicle occupant to select one of the parking zones; and
automatically selecting one of the parking zones if no user selection of one of the parking zones is received within a predetermined amount of time.

20. The method of claim 19, wherein one of the parking zones is automatically selected based on the rank associated with each of the multiple parking zones.

* * * * *